J. J. ANDERSON.
FURNACE FOR OBTAINING METAL FROM ORE OR MATTE.
APPLICATION FILED FEB. 9, 1911.
1,020,531.
Patented Mar. 19, 1912.
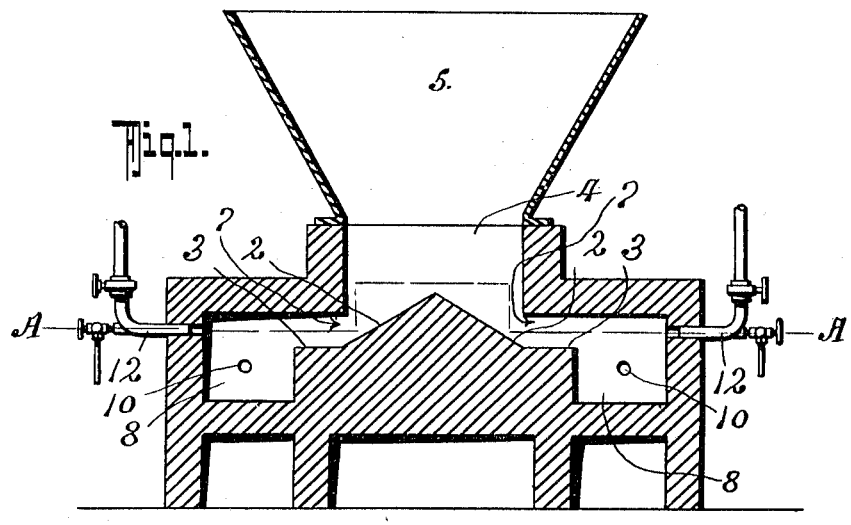
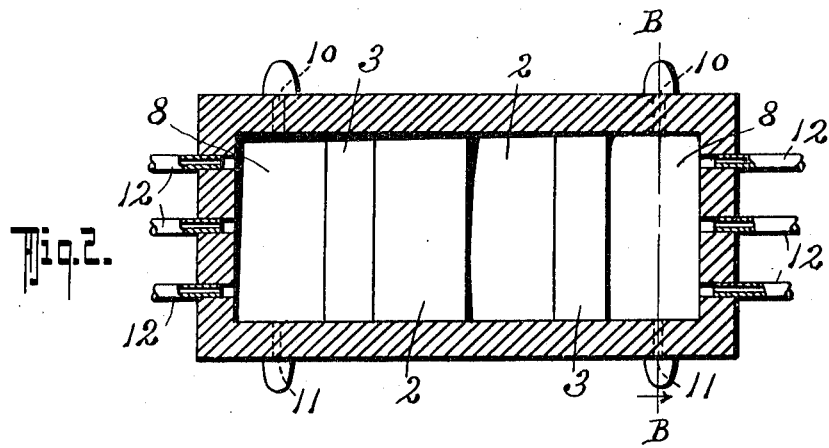
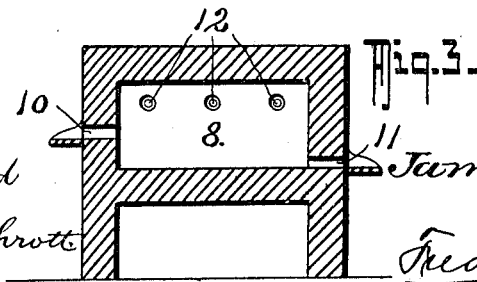
WITNESSES:
H. Woodard
John J. Schrott
INVENTOR
James J. Anderson
BY
Fred G. Dieterich
ATTORNEYS

UNITED STATES PATENT OFFICE.

JAMES J. ANDERSON, OF VANCOUVER, BRITISH COLUMBIA, CANADA.

FURNACE FOR OBTAINING METAL FROM ORE OR MATTE.

1,020,531. Specification of Letters Patent. Patented Mar. 19, 1912.

Application filed February 9, 1911. Serial No. 607,581.

*To all whom it may concern:*

Be it known that I, JAMES J. ANDERSON, a citizen of the Dominion of Canada, residing at Vancouver, in the Province of British Columbia, Canada, have invented a new and useful Furnace for Obtaining Metal from Ore or Matte, of which the following is a specification.

This invention relates to a means for obtaining metal from ore or matte by a continuous process, whereby satisfactory results may be obtained much more economically than can be at present accomplished by any of the known processes as conducted in a reverberatory furnace or a converter which require to be periodically charged.

The invention is a modification of that set forth in my applications filed December 18, 1905, Serial Nos. 292267 and 292268, respectively, on a "furnace and process for abstracting metal from ore," the improvement being particularly directed to prevent portions of ore falling into the hearth or receptacle for the molten metal and slag before they have been fused or rendered fluid.

In this invention, as in the previous one, a reducing flame of gas or crude oil is directed into an exposed restricted face of the ore or matte, and the material fused by that concentrated application of heat, is allowed to run into a hearth where being maintained at a high temperature complete separation of the metal from its gangue will be effected by gravity and the metal and slag may be tapped from separate apertures provided.

The invention is particularly described in the following specification, reference being made to the drawings by which it is accompanied, in which:

Figure 1 is a vertical cross section through a double furnace particularly designed to effect the reduction of copper from copper matte, and Fig. 2, a sectional plan of the same on the line A A in Fig. 1.

The furnace consists of a substantially rectangular brick chamber supported on a suitable foundation. In its mid-length there is an opening 4 in the roof of the chamber which opening is at the base of a hopper 5 into which the matte is delivered. Immediately under the opening 4 at the base of the hopper the chamber is divided by a partition extending across it and having a double slope 2 from the middle of the aperture 4, within which aperture the ridge may project, and terminating approximately immediately under the inner sides of the opening 4. From the base of the slope 2 on each side a ledge 3 is formed leaving a restricted opening 7 between it and the roof of the chamber and delivering to a combustion chamber 8 on each side. The bottom of the combustion chamber forms a hearth for the reception of the molten metal and slag as it is fused and is provided with a tapping aperture 11 in the level of the bottom for the withdrawal of the metal and overflow 10 for the slag.

In each opposite end of the furnace chamber and horizontally in line with the passage 7 from the bottom of the ore or matte hopper are burners 12 of any approved design that will direct a powerful fusing and reducing flame upon the exposed face of the matte at 7. Such number of these burners as may be required, may be arranged across the width of the furnace to insure the maintenance of sufficient heat in the combustion chamber and effectively act upon the exposed surface of the matte at 7.

In use the matte is charged into the hopper at 5 and the inclines of 2 will direct it toward the lateral apertures 7 to the combustion chamber where it will be checked on the ledge 3 of each and retained there until under the fusing action of the burner flames the ore and its gangue is melted and runs over the edge of 3 into the hearth forming the bottom of the combustion chamber 8. As the ore on the exposed face melts and runs down, its place will be taken by fresh material sliding down the incline at 2 from the hopper 5.

The essential feature of this invention as distinguishing this furnace from the one revealed in the patent referred to in the preamble of this specification lies in the provision of the horizontal ledge 3 which prevents pieces of ore or matte falling into the hearth but retains them on the ledge until they are fused and can flow. The hearth being at the bottom of a comparatively shallow combustion chamber will be maintained at a high temperature and the contents of slag and metal will be sufficiently fluid to readily separate themselves by gravity. The fusing and separation of the ore being conducted in a closed chamber from which air is excluded the reduction of the metal of the ore is fully effected, and the ore hopper being charged from above and self-feeding toward the fusing face the operation is practically continuous which is a manifest saving, both in labor and fuel and more uniform results are obtainable.

The furnace will be constructed with an arched roof and in accordance with the most approved practice for such furnaces.

Care must be taken that the walls of the combustion chamber and particularly those portions of it adjacent to the exposed face of the ore at 7 are built of refractory brick that will resist the heat of the flame and the action of the flux with which the ore may be associated.

Having now particularly described my invention and the manner of its use, I hereby declare that what I claim as new and desire to be protected in by Letters Patent, is:

A furnace for obtaining metal from ore or matte, said furnace comprising a hopper having a bottom downwardly inclined toward a restricted lateral inlet to a combustion chamber, a horizontal ledge at the base of the incline at the said inlet and means for projecting a reducing blast across the combustion chamber against the exposed face of the ore at the inlet from the hopper and on the ledge.

In testimony whereof I have signed my name to this specification in the presence of two subscribing witnesses.

JAMES J. ANDERSON.

Witnesses:
 ROWLAND BRITTAIN,
 WM. SMITH SOUTAR.

---

Copies of this patent may be obtained for five cents each, by addressing the "Commissioner of Patents, Washington, D. C."